United States Patent
Herzog et al.

(10) Patent No.: US 12,128,747 B2
(45) Date of Patent: Oct. 29, 2024

(54) ASSEMBLY CARRIER OF A VEHICLE DOOR, AND METHOD FOR PRODUCING AN ASSEMBLY CARRIER

(71) Applicant: Brose Fahrzeugteile SE & Co. Kommanditgesellschaft, Bamberg, Bamberg (DE)

(72) Inventors: Hans Herzog, Strullendorf (DE); Michael Jahn, Bad Staffelstein (DE); Stephanie Wurpes, Bamberg (DE); Michael Salzmann, Bamberg (DE); Martin Schlechtriemen, Muenchberg (DE)

(73) Assignee: BROSE Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 277 days.

(21) Appl. No.: 17/728,126

(22) Filed: Apr. 25, 2022

(65) Prior Publication Data

US 2022/0242204 A1     Aug. 4, 2022

Related U.S. Application Data

(63) Continuation of application No. PCT/EP2020/079303, filed on Oct. 19, 2020.

(30) Foreign Application Priority Data

Oct. 23, 2019   (DE) ............... 10 2019 216 278.9

(51) Int. Cl.
*B60J 5/04*      (2006.01)

(52) U.S. Cl.
CPC ........... *B60J 5/0416* (2013.01); *B60J 5/0413* (2013.01); *B60J 5/0463* (2013.01)

(58) Field of Classification Search
CPC ....... B60J 5/0416; B60J 5/0418; B60J 5/0413
USPC ................................. 296/146.7; 49/501, 502
See application file for complete search history.

(56) References Cited

U.S. PATENT DOCUMENTS

| | | | |
|---|---|---|---|
| 6,449,907 B2 * | 9/2002 | Nishikawa | B60J 5/0451 296/146.7 |
| 10,974,577 B2 | 4/2021 | Baath et al. | |
| 11,833,981 B2 * | 12/2023 | Distler | B60R 13/0206 |
| 2023/0356572 A1 * | 11/2023 | Iannone | B60J 5/0455 |

FOREIGN PATENT DOCUMENTS

| | | |
|---|---|---|
| DE | 19824130 A1 | 12/1999 |
| DE | 102005033116 A1 | 1/2007 |
| DE | 102016008728 B3 | 7/2017 |

* cited by examiner

*Primary Examiner* — Jason S Morrow
(74) *Attorney, Agent, or Firm* — Laurence A. Greenberg; Werner H. Stemer; Ralph E. Locher

(57) ABSTRACT

An assembly carrier of a vehicle door has at least one break-out element, which is connected to the material of the assembly carrier via at least one peripheral weakened region. The weakened region has a lower material thickness than the remainder of the assembly carrier material. The weakened region acts as a predetermined breaking point and forms a periphery of a service opening. The weakened region is arranged in a ring all around the break-out element. The break-out element is jointly formed with the assembly carrier in a common injection mold.

13 Claims, 9 Drawing Sheets

ASSEMBLY CARRIER OF A VEHICLE DOOR, AND METHOD FOR PRODUCING AN ASSEMBLY CARRIER

CROSS-REFERENCE TO RELATED APPLICATION

This application is a continuation, under 35 U.S.C. § 120, of copending International Patent Application PCT/EP2020/079303, filed Oct. 19, 2020, which designated the United States; this application also claims the priority, under 35 U.S.C. § 119, of German Patent Application DE 10 2019 216 278.9, filed Oct. 23, 2019; the prior applications are herewith incorporated by reference in their entirety.

FIELD AND BACKGROUND OF THE INVENTION

The invention relates to an assembly carrier of a vehicle door, having at least one break-out element which is connected to the material of the assembly carrier by way of at least one encircling weakened region with a smaller material thickness. The invention also relates to a method for producing such an assembly carrier.

A door body of a vehicle door generally has a door outer panel which forms the door outer skin of the vehicle door and a door inner panel which is connected to the door outer panel and which is on the inner side with respect to the vehicle, between which inner and outer panel there is formed a hollow space as an assembly space in which functional elements of the vehicle door, such as a window regulator, a door lock, an airbag or the like, are arranged.

In order to assemble functional components in a vehicle door, for example window regulator, drive device, side airbag module, speaker, operator control unit or the like, it is possible for such functional components to be preassembled on a carrier plate, also referred to as a door module carrier or assembly carrier. The functionality of the preassembled functional components can already be suitably checked in the preassembled state. The loaded assembly carrier can subsequently be placed onto an assembly opening of the vehicle door so as to cover said assembly opening, in particular in order to implement a wet space/dry space separation.

After the assembly carrier has been installed in a vehicle door, it is more difficult to access the individual functional components arranged on the assembly carrier. Thus, in particular the functional components lying in the wet space between the door inner skin (of which the assembly carrier forms at least a constituent part) and the door outer skin, that is to say the functional components arranged on the wet-space-side surface of the assembly carrier, can be accessed only with difficulty for assembly or repair purposes in the case of motor vehicles with a fixed (not readily releasable) connection between door inner skin and door outer skin.

In order to facilitate assembly, repair or service work on functional components which lie on a surface of the assembly carrier that is not freely accessible in the installed state even after the assembly carrier has been installed in a motor vehicle door, it is possible to provide at least one so-called service opening on the assembly carrier. The service opening allows an assembly tool to engage through the assembly carrier.

There is the problem here that such service openings have an adverse effect on the wet space/dry space separation implemented by the assembly carrier. It is therefore necessary for such assembly or service openings to be closed in a moisture-tight manner by way of a closure element, in order to ensure reliable wet/dry space separation. In this case, for example during the assembly of the assembly carrier, in an additional process step, the service opening is closed by way of a closure element in the form of a plug or cover made of rubber or made of a soft plastic. Such closure elements for closing assembly or service openings thus result in increased, often manual, assembly effort, an increased number of parts, and increased susceptibility to error.

Such a service case in which the service opening is required typically occurs only in a small number of vehicle doors, say, approximately 5% of motor vehicles. The closure elements described above are therefore preferably omitted, and only used if such a service case actually occurs.

In order to close the service openings, it is for example possible for so-called break-out elements or break-out plugs to be provided, which are arranged on the assembly carrier in the region of the service opening. Such break-out elements are enclosed by an encircling weakened region as predetermined breaking point. The break-out element enclosed by the weakened region can be broken out of the assembly carrier by introduction of force, in order to in this way open the service opening as required.

SUMMARY OF THE INVENTION

It is accordingly an object of the invention to provide an assembly carrier for a vehicle door which overcomes a variety of disadvantages of the heretofore-known devices and methods of this general type and which provides for a particularly suitable assembly carrier. It is a further object to specify a particularly suitable method for producing such an assembly carrier.

With the above and other objects in view there is provided, in accordance with the invention, an assembly carrier of a vehicle door, the assembly carrier comprising:
  assembly carrier material having a given material thickness;
  at least one break-out element connected to said assembly carrier material by way of at least one encircling weakened region having a smaller material thickness than said given thickness;
  said weakened region forming a predetermined breaking point and forming a boundary of a service opening;
  said weakened region being formed continuously in a shape of a ring around said break-out element; and
  said break-out element being jointly injected-molded with said assembly carrier material in an injection molding tool.

The assembly carrier according to the invention is suitable, and configured, for a vehicle door. In particular, the assembly carrier is provided, and designed, for accommodation or holding of functional components of the vehicle door and/or in the form of wet/dry space separation, and also for installation in the vehicle door. The conjunction "and/or" is to be understood here and below to mean that the features linked by means of this conjunction may be implemented both jointly and as alternatives with respect to one another.

The assembly carrier has at least one break-out element as a break-out plug for the in particular fluid-tight, that is to say water-impermeable and air-impermeable, closing of an assigned hole-like service opening. In the open state, the service opening allows an (assembly) tool to engage through the assembly carrier, that is to say allows the tool to pass through, at least in certain portions, from a dry space side to the wet space side of the assembly carrier.

The break-out element is connected to the material of the assembly carrier by way of at least one encircling weakened region with a smaller material thickness, wherein the weakened region is in the form of a predetermined breaking point and forms a boundary of the service opening.

In this case, the fluid-tight weakened region is arranged continuously in the shape of a ring around the break-out element. In other words, the weakened region is a completely closed ring, which encloses the break-out element at the circumference. In this case, the break-out element and the assembly carrier are jointly produced in an injection molding tool. This means that the at least one break-out element and the assembly carrier are produced in a common injection molding tool, that is to say in a common injection molding process. As a result, a particularly suitable assembly carrier is realized.

The weakened region makes it possible for the break-out element to be broken out of or released or removed from the assembly carrier as required by means of the introduction of force, such that the weakened region is destroyed, with the result that the service opening in the assembly carrier can be opened. The break-out element is thus preferably broken out or removed only in a service case. As a result of the opened service opening can subsequently be used to carry out repair or service work. The service opening is subsequently suitably closed again by way of a plug-like or cover-like closure element.

In an advantageous configuration, the break-out element is molded on the assembly carrier in one piece, that is to say in one part or monolithically. The encircling weakened region is integrally connected to the material of the assembly carrier. This means that the break-out element and the assembly carrier are produced, for example, from the same material. As a result, a break-out element that is particularly easy to produce is realized.

In an alternative embodiment, it is for example possible for the weakened region present in the assembly carrier to be produced directly by a dedicated, separate hot runner nozzle of the injection molding tool, in the case of which merely a required shot weight is injected into the prefabricated assembly carrier. The injected material plastifies at the interface to the rest of the carrier and in this case forms the weakened region by way of a binding seam. The injection is preferably effected in a time-controlled manner. In other words, an additional injection point is provided in the region of the service opening and is actuated with a time delay. As a result, it is possible to reliably fill the geometry of the break-out element.

In a preferred embodiment, the weakened region is produced by an embossing punch of the injection molding tool. The weakened region is in this case produced after the injection molding process, for example. However, the weakened region is preferably produced during the injection molding process, that is to say in the injection molding tool. In this case, the embossing punch is for example in the form of a slider of the injection molding tool, in particular in the form of a mechanically or hydraulically actuated or actuable core pull. As a result, a weakened region that is particularly easy and cost-effective to produce is realized.

In a possible embodiment, the weakened region has a material thickness that is smaller than or equal to 15% of the material thickness of the assembly carrier. In other words, the material thickness of the weakened region is reduced by at least 85% in relation to the material thickness of the assembly carrier. This ensures that the break-out element is broken out in a simple manner.

By way of example, the assembly carrier has a material thickness of between 1.0 mm (millimeters) and 2.0 mm, in particular between 1.4 mm and 1.8 mm. On the basis of the aforementioned percent values and dimensions, provision is made in a suitable configuration for the weakened region to have a material thickness that is smaller than or equal to 0.5 mm, in particular smaller than or equal to 0.2 mm. This ensures that the break-out element is broken out in a particularly simple manner.

An additional or further aspect of the invention provides that the break-out element has a tool contour which is molded in one piece. The tool contour projects approximately perpendicularly with respect to the break-out element or the assembly carrier in a suitable manner and is suitable, and configured, for gripping with a tool. In this case, the tool contour is arranged in particular on a dry space side of the assembly carrier or of the break-out element. The tool contour has a substantially rectangular geometry. In other words, the tool contour is in the form of an actuation region for a tool to access. As a result of the tool contour, a defined handling region is produced, by means of which the weakened region can be destroyed with a tool in a particularly simple manner, and thus the break-out element can be broken out in a particularly simple manner. In particular, a simple and controlled break-out operation is thus made possible, as a result of which damage to the assembly carrier or the functional elements assembled thereon is avoided in an advantageous and simple manner.

In a suitable refinement, the tool contour of the break-out element has two narrow sides as first gripping surfaces for first pliers, and two longitudinal sides, which are oriented perpendicularly thereto, as second gripping surfaces for second pliers. The narrow sides and longitudinal sides are thus provided, and designed, as gripping surfaces for different pliers. In order to avoid a special tool for the break-out element, the dimensions of the narrow sides and longitudinal sides are adapted to conventional pliers. Preferably, the narrow sides are provided, and designed, for gripping with gas pliers, and the longitudinal sides are provided, and designed, for gripping with combination pliers.

The break-out element can thus be broken out in a simple manner by exerting pressure on the tool contour with pliers until the material in the weakened region yields, and the break-out element detaches from the assembly carrier. The approximately rectangular tool contour essentially precludes the break-out element from unintentionally falling into the wet space. In addition, the tool contour according to the invention makes it possible, depending on the pliers used, for the break-out element to be able to be released from the assembly carrier by means of a force that can be metered easily. The tool contour ensures simple gripping and holding with pliers, and so the break-out element can be removed from the assembly carrier in a simple manner for example by means of a vertical up/down movement and/or a horizontal left/right movement.

In a conceivable embodiment, the longitudinal sides each have two perpendicularly oriented stiffening ribs on the outer side. In other words, the longitudinal sides are laterally stabilized. As a result, a particularly stable tool contour is realized, as a result of which it is ensured that the tool contour is not destroyed by the applied force during a break-out operation. It is thus ensured that a reliable and safe hold on the tool contour is realized when the break-out element is being broken out.

With the above and other objects in view there is also provided, in accordance with the invention, a method of producing an assembly carrier of a vehicle door. The method comprises the following method steps:

producing the assembly carrier and at least one break-out element in a common injection molding process; and forming a weakened region by pressing an embossing punch with an embossing contour into a melt, which has not yet fully solidified, during the injection molding process, with the weakened region enclosing the at least one break-out element.

The advantages and configurations mentioned herein with respect to the assembly carrier are also transferable analogously to the method and vice versa.

In other words, the method according to the invention is suitable, and configured, for producing an above-described assembly carrier. According to the method, the assembly carrier and the at least one break-out element are produced in a common injection molding process. In order to produce the weakened region, provision is in this case made for an embossing punch with an embossing contour to be pressed or pushed into the (plastics) melt, which has not yet fully solidified, around the at least one break-out element during the injection molding process. In other words, the weakened region is produced by downward embossing or displacement of the melt which has not yet plastified or cooled.

During the production of the assembly carrier and the break-out element, the weakened region thus initially has the plastics melt supplied to it or applied to it by injection, and is subsequently embossed or thinned out, that is to say the material thickness is reduced, by means of the embossing punch. This ensures that the weakened region is supplied with the plastics melt to a sufficient extent during the injection molding process, such that a fluid-tight weakened region is ensured after the embossing. Furthermore, the material thickness of the weakened region can be varied or set in a particularly simple manner by way of the embossing punch.

The embossing contour is, for example, approximately hollow-cylindrical or tubular, and the embossing contour tapers on the free end side. In other words, the free end of the embossing contour has, in cross section, approximately the shape of a wedge or the shape of a point. This ensures that a particularly thin or narrow weakened region is produced, as a result of which a very smooth and flat boundary of the service opening remains when the break-out element is being broken out.

In a possible embodiment, the break-out element is produced with a perpendicularly projecting tool contour, wherein the embossing punch is pressed into the melt from a side of the assembly carrier that is situated opposite the tool contour. In this case, the tool contour is arranged in particular on a planar side of the assembly carrier, said planar side facing toward a dry space in the assembled state of the assembly carrier. This means that the embossing punch is pressed or pushed into the plastics melt substantially from the wet space side of the assembly carrier.

Other features which are considered as characteristic for the invention are set forth in the appended claims.

Although the invention is illustrated and described herein as embodied in an assembly carrier of a vehicle door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and dimensions which correspond to one another are denoted by the same reference designations throughout the figures.

DETAILED DESCRIPTION OF THE INVENTION

Figure 1:
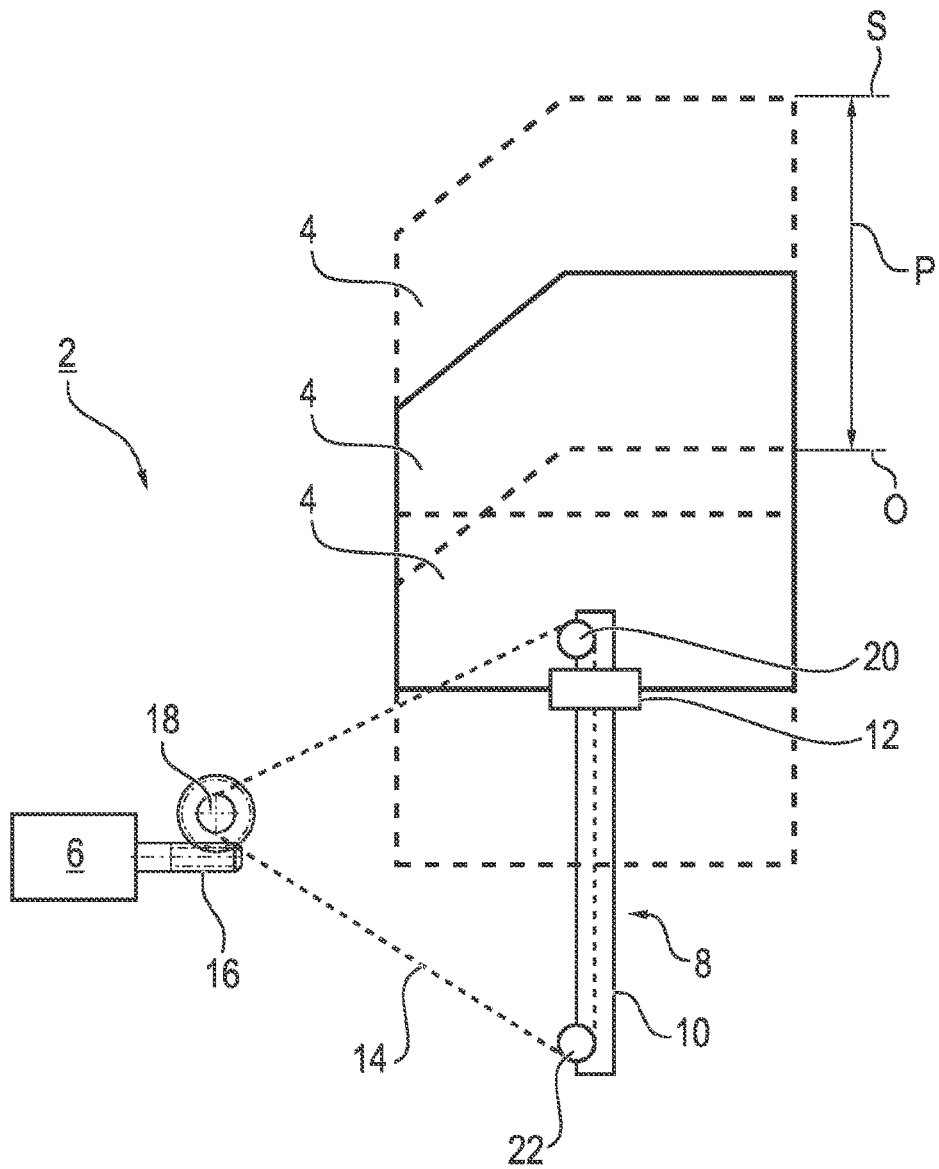
FIG. 1 shows a schematic illustration of a window regulator of a vehicle side door.

Referring now to the figures of the drawing in detail and first, in particular, to FIG. 1 thereof, there is shown a simplified and schematic illustration of an electric window regulator 2 being an actuating apparatus or actuator for a (vehicle) window pane 4 of a motor vehicle.

The window regulator 2, or window lifter, has an actuating motor 6 which acts on the window pane 4 by way of an actuating mechanism 8. The actuating mechanism 8 has at least one guide rail 10 and at least one driver or rail slider 12 which is coupled to the window pane 4. The actuating mechanism 8 also has a cable pull 14 with respect to the guide rail 10.

The actuating motor 6 of the window regulator 2 drives a cable drum 18 of the actuating mechanism 8 by way of a worm-gear or spur-gear transmission 16. A pull cable of the cable pull 14 is arranged on the cable drum 18 in such a way that the pull cable winds up and unwinds during rotational movements of the cable drum 18 that are caused by the transmission 16.

An upper cable deflection roller 20 and a lower cable deflection roller 22 are fastened to the guide rail 10, said upper and lower cable deflection roller being arranged on the opposite (rail) end sides. The pull cable of the cable pull 14 is guided around the cable deflection rollers 20, 22.

During an actuation of the actuating motor 6, the window pane 4 is displaced into its (sliding) position P. Here, the window pane 4 is reversibly displaceable between a closed position S, which represents the highest possible position P, and an open position O, which represents the lowest possible position P. In these positions S and O, the window pane 4 is in each case indicated by dashed lines in FIG. 1. By contrast, the window pane 4 is illustrated in a half-open intermediate position by way of solid lines.

Figure 2:
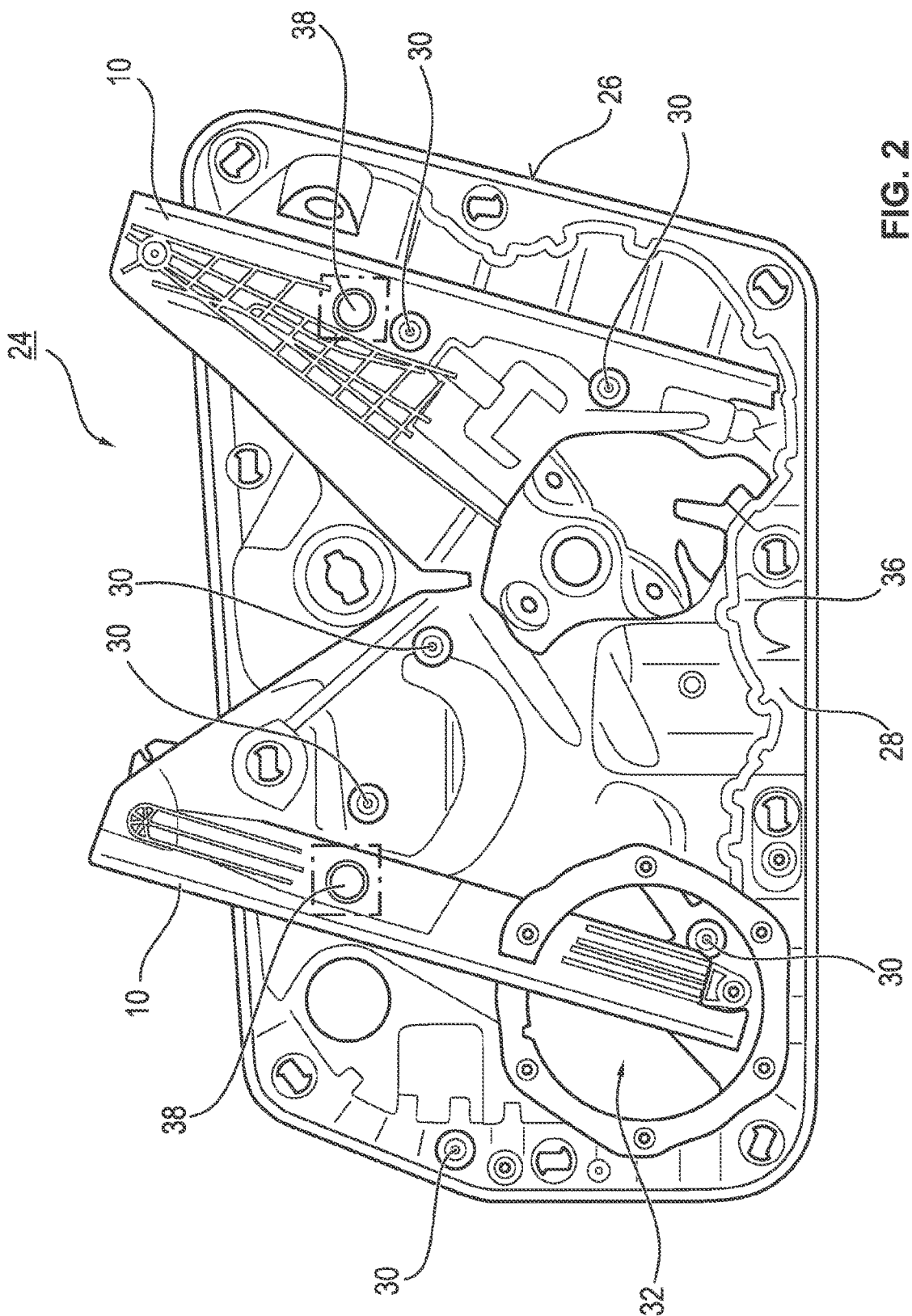
FIG. 2 shows a plan view of an assembly carrier of the window regulator looking at a wet space side.
Figure 3:
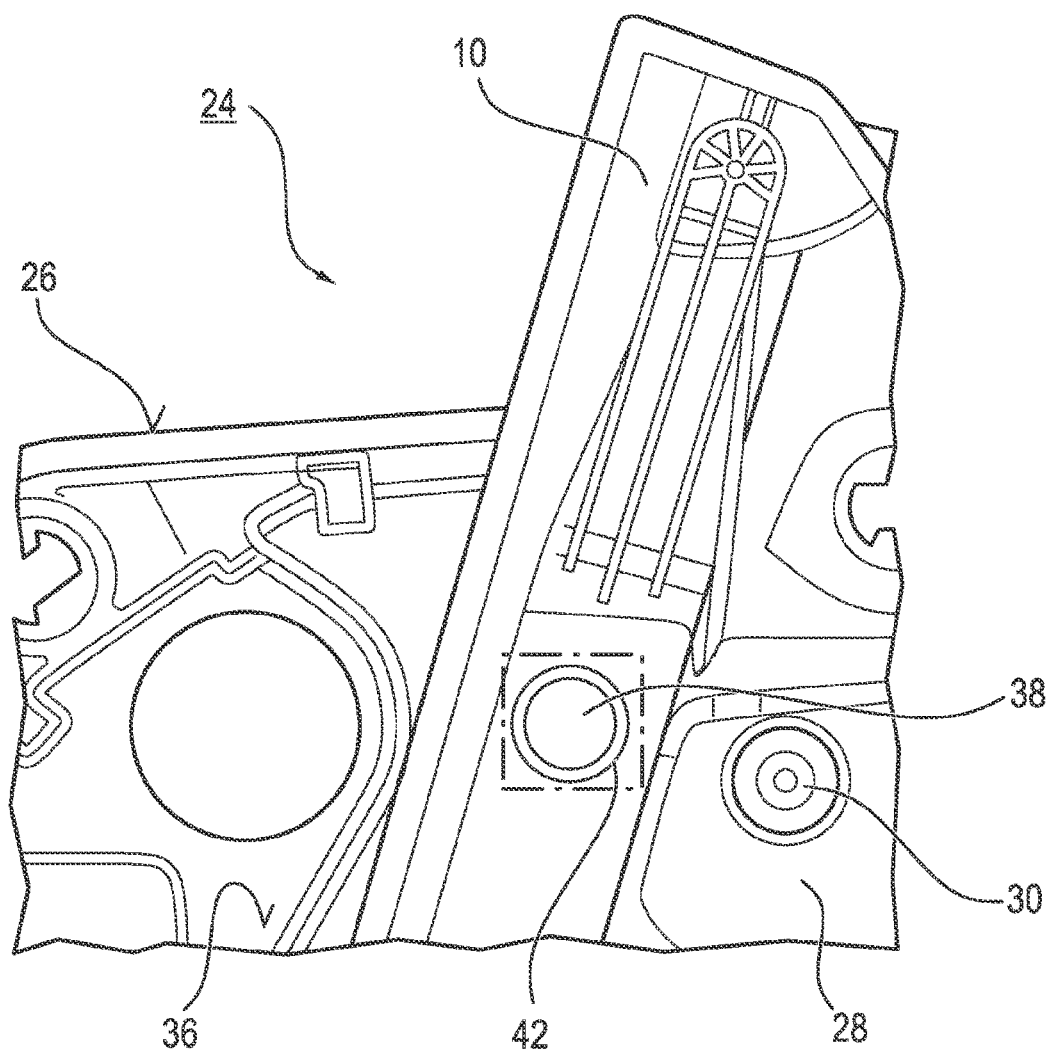
FIG. 3 shows a plan view of a detail of the assembly carrier in the region of a break-out element looking at a wet space side.

FIG. 2 illustrates a perspective view of an assembly carrier 24 for the motor vehicle door, on which assembly carrier various functional components of the motor vehicle door, such as two guide rails 10 for the window regulator 2 which are molded in one piece in the present case, and also a rail slider 12, which is guided thereon, for the window pane 4 to be adjusted, are or can be arranged.

The assembly carrier 24 has a plate-shaped main body 28 in the form of a carrier plate, which is delimited by an encircling edge 26. In this exemplary embodiment, six fastening points 30 for further functional components, such as for the actuating motor 6, and an opening 32 for accommodating a speaker are provided on the assembly carrier 24 or on the main body 28 thereof.

Figure 4:
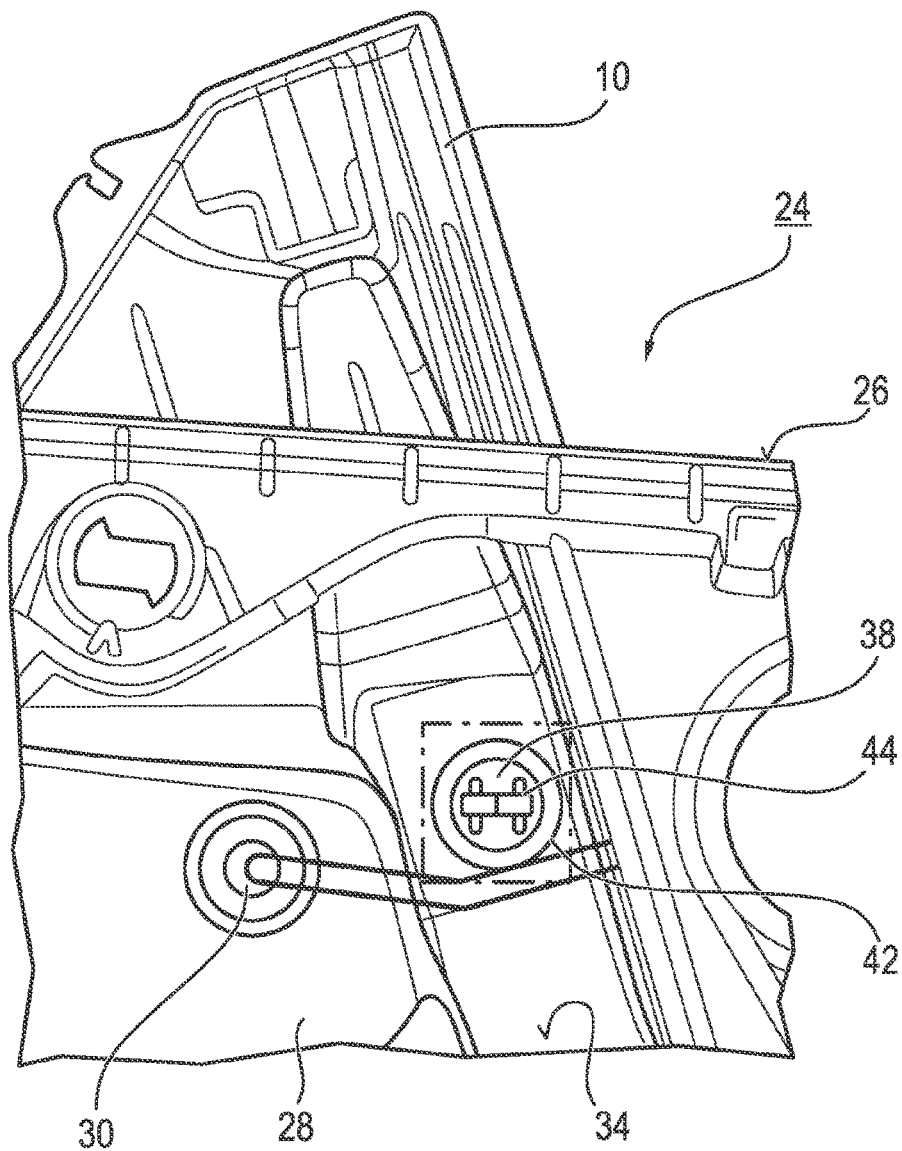
FIG. 4 shows a plan view of a detail of the assembly carrier in the region of a break-out element looking at a dry space side.

The assembly carrier 24 is installed such that the assembly carrier 24 covers a large-area cutout provided in the door inner skin of the corresponding motor vehicle door and bears with its encircling outer edge 26 on the door inner skin by way of a seal. The assembly carrier 24 thus forms a constituent part of the door inner skin which separates the so-called dry space of the corresponding motor vehicle door, and thus the interior of a motor vehicle (in the case of a closed motor vehicle door), from the so-called wet space of the motor vehicle door. That surface 34 of the assembly carrier 24 or of the carrier plate 28 which faces toward the vehicle interior or dry space is correspondingly also referred to below as vehicle-interior-side or dry-space-side surface or dry space side (FIG. 4), while the surface 36 which faces toward the door outer skin and thus the wet space of the motor vehicle door is also referred to below as outer or wet-space-side surface or wet space side of the assembly carrier 24.

Figure 5:
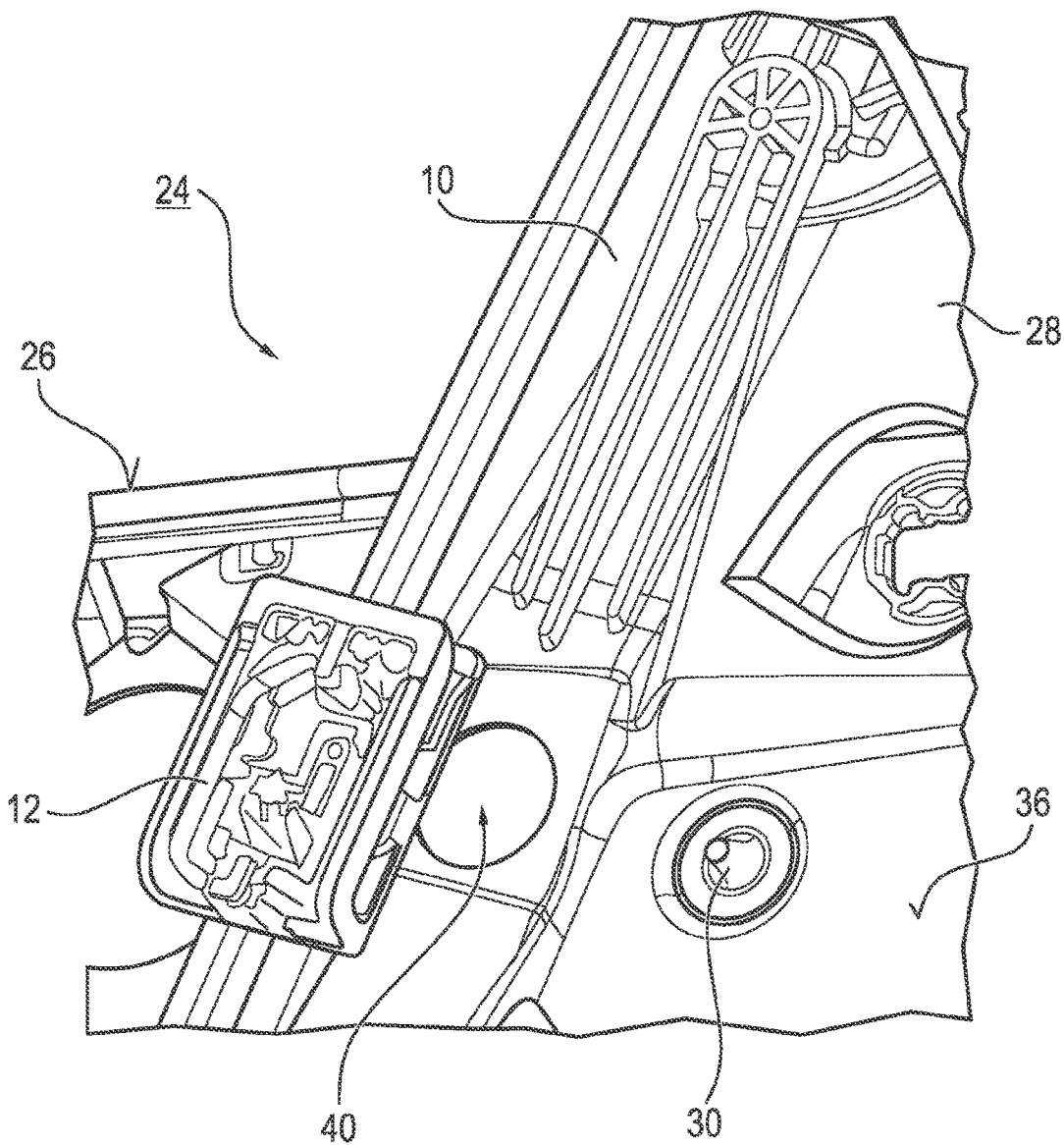
FIG. 5 shows a perspective view of a detail of the assembly carrier with a rail slider and a removed break-out element.
Figure 6:
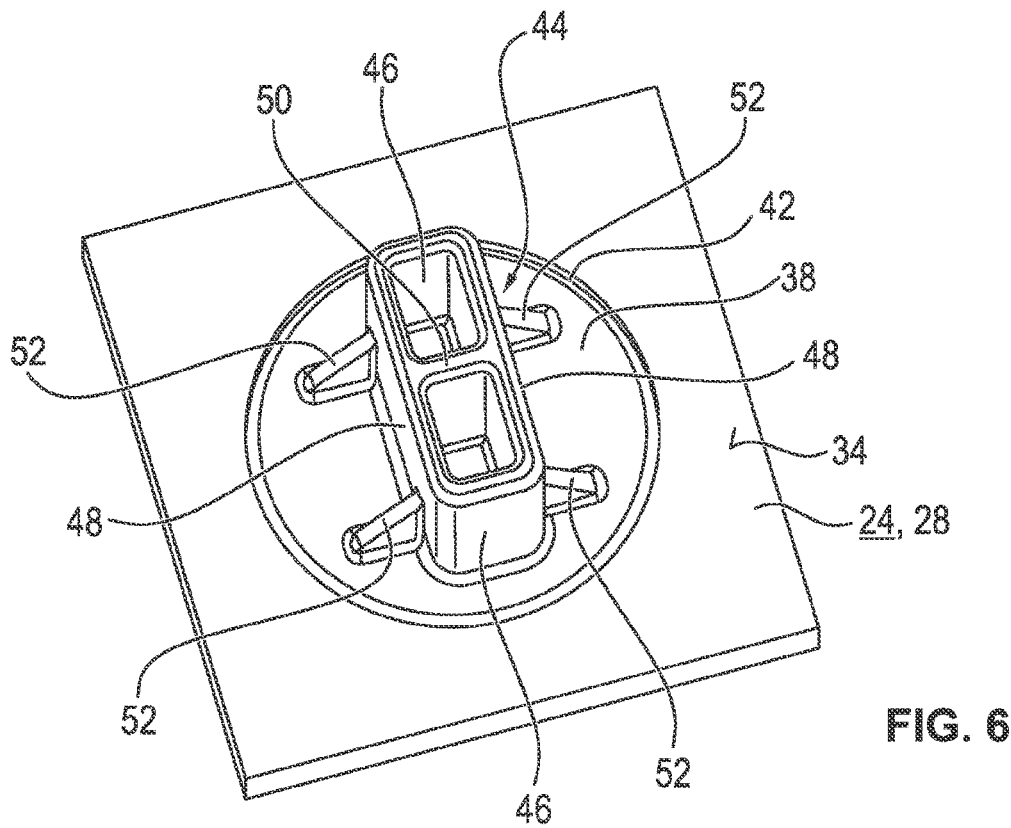
FIG. 6 shows a perspective view of the break-out element looking at a tool contour on the dry space side.

In the exemplary embodiment shown, the assembly carrier 24 has two break-out elements 38 as break-out plugs for the in particular fluid-tight, that is to say water-impermeable and air-impermeable, closing of an assigned hole-shaped service opening 40 (FIG. 5). In the open state, the service opening 50, or tool access opening, allows an (assembly) tool to engage through the assembly carrier 24.

A first exemplary embodiment of the break-out element 38 is explained in more detail below on the basis of FIGS. 3 to 9.

As can be seen in FIGS. 2 to 5, the break-out elements 38 are arranged in the region of the guide rails 10. The, or each, break-out element 38 is connected to the assembly carrier 24 by way of an encircling weakened region 42. In this case, the break-out element 38 is molded on the assembly carrier 24 or on the main body 28 in one piece, that is to say in one part or monolithically, wherein the weakened region 42 which runs around continuously in the shape of a ring is integrally connected to the material of the assembly carrier 24.

The weakened region 42 is in the form of a predetermined breaking point, which forms a circumferential boundary of the service opening 40 in the case of a broken-out or removed break-out element 38. The fluid-tight weakened region 42 is arranged continuously in the shape of a ring around the break-out element 38. In other words, the weakened region 42 is a completely closed ring, which encloses the break-out element 38 at the circumference.

The weakened region 42 makes it possible for the break-out element 38 to be broken out of or released or removed from the assembly carrier 24 or from the main body 28 thereof as required by means of the introduction of force, such that the weakened region 42 is destroyed, with the result that the service opening 40 in the assembly carrier 24 can be opened. The break-out element 38 is thus preferably broken out only in a service case. As a result of the opened service opening 40 can subsequently be used to carry out repair or service work. The hole-like service opening 40 is subsequently suitably closed again by way of a closure element (not shown in any more detail).

Figure 9:
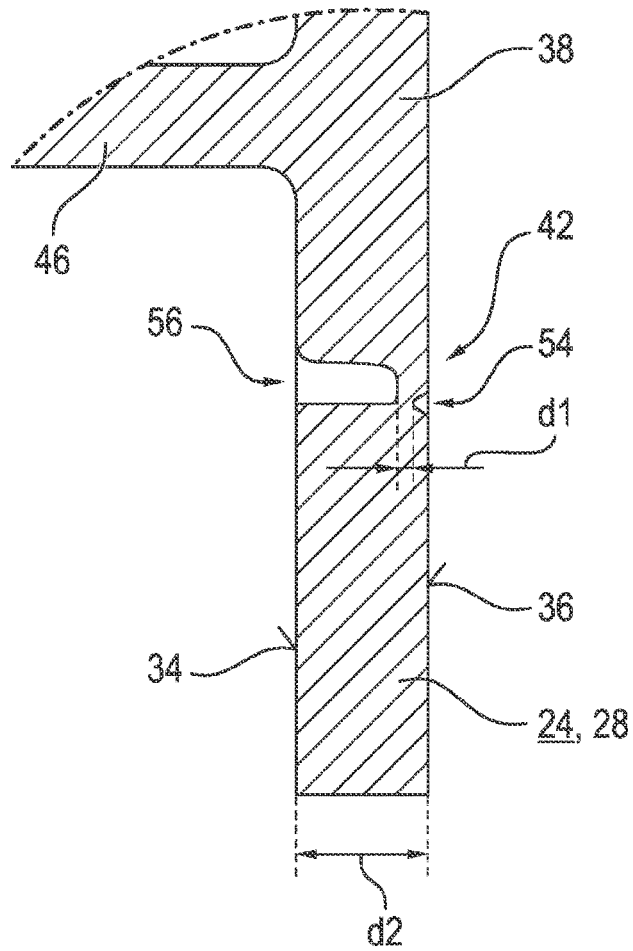
FIG. 9 shows a sectional illustration of a detail of a weakened region in detail A in FIG. 8.

The weakened region 42 has a smaller material thickness $d_1$ than the surrounding material of the assembly carrier 24. In other words, the weakened region 42 has a material thickness $d_1$ which is reduced in relation to a material thickness $d_2$ of the assembly carrier 24 (FIG. 9). The material thickness $d_1$ of the weakened region 42 is smaller than or equal to 15% of the material thickness $d_2$ of the assembly carrier 24. In other words, the material thickness $d_1$ of the weakened region 42 is reduced by at least 85% in relation to the material thickness $d_2$ of the assembly carrier 24.

In a suitable dimensioning, the assembly carrier 24 has, for example, a material thickness $d_2$ of between 1.0 mm and 2.0 mm, in particular between 1.4 mm and 1.8 mm. The weakened region 42 suitably has a material thickness $d_1$ that is smaller than or equal to 0.5 mm, in particular smaller than or equal to 0.2 mm. The service opening 40 has, for example, a diameter of approximately 23 mm.

The break-out element 38 illustrated individually in FIGS. 6 to 9 has a substantially smooth or flat surface on the wet space side 36. On the opposite dry space side 34, the break-out element 38 has a tool or actuation contour 44 which is molded in one piece and which projects approximately perpendicularly with respect to the assembly carrier 24 or the main body 28.

The tool contour 44 is suitable, and configured, for gripping with a tool. In other words, the tool contour 44 is in the form of an actuation region for a tool to access. As a result of the tool contour 44, a defined handling region is produced, by means of which the weakened region 42 can be destroyed with a tool in a particularly simple manner, and thus the break-out element 38 can be broken out of or removed from the main body 28 of the assembly carrier 24 in a particularly simple manner.

Figure 7:
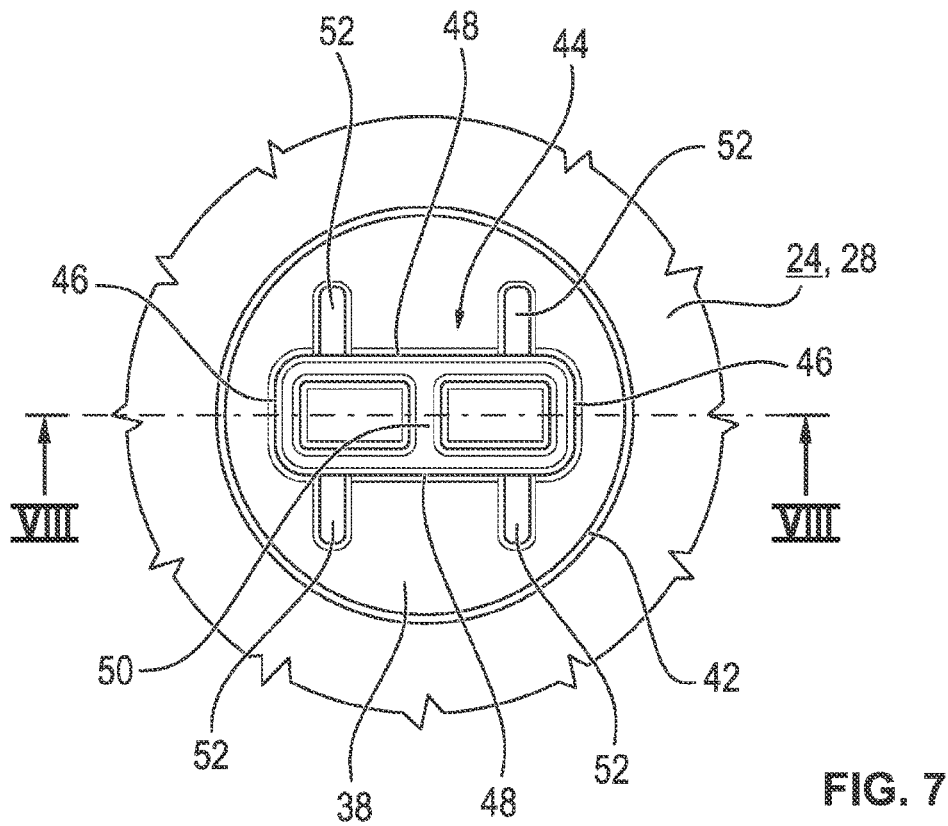
FIG. 7 shows a plan view of the break-out element looking at the dry space side.

As can be seen in particular in the plan view of FIG. 7, the tool contour 44 has a substantially rectangular cross-sectional shape or geometry. The rectangular tool contour 44 has two narrow sides 46 and two longitudinal sides 48 which are oriented perpendicularly thereto. The narrow sides 46 and longitudinal sides 48 are preferably provided, and designed, as gripping surfaces for different pliers.

The narrow sides 46 are in the form of first gripping surfaces for first pliers, and the longitudinal sides 48 are in the form of second gripping surfaces for second pliers. In particular, the dimensions of the narrow sides 46 and longitudinal sides 48 are adapted to conventional pliers. Preferably, the narrow sides 46 are provided, and designed, for gripping with gas pliers, and the longitudinal sides 48 are provided, and designed, for gripping with combination pliers.

The tool contour 44 ensures simple gripping and holding with pliers, and so the break-out element 38 can be removed from the assembly carrier 24 in a simple manner for example by means of a vertical up/down movement and/or a horizontal left/right movement.

In the exemplary embodiment of the break-out element 38 shown in FIG. 6 to FIG. 9, the tool contour 44 has a transverse web 50 which extends between the longitudinal sides 48 and which is arranged approximately centrally between the narrow sides 46. The transverse web 50 acts, on the one hand, as a central stiffening or stabilization means for the tool contour 44 and, on the other hand, as an additional gripping surface corresponding to the narrow sides 46. Two receptacles (not denoted in any more detail) for the engagement of pliers are thus substantially provided between the narrow sides 46 and the transverse web 50 and between the longitudinal sides 48.

The longitudinal sides 48 each have two stiffening ribs 52 which are perpendicularly oriented, that is to say are arranged approximately parallel to the narrow sides 46 and the transverse web 50, and which are molded on an outer side 48 of the longitudinal sides 48. The stiffening ribs 52 have an approximately triangular cross-sectional shape in a section plane perpendicular to the plane of the main body 28.

The sufficient strength required for the transmission of the tear-off forces in the weakened region 42 is imparted to the tool contour 44 by the laterally transversely oriented stiffening ribs 52.

Figure 8:
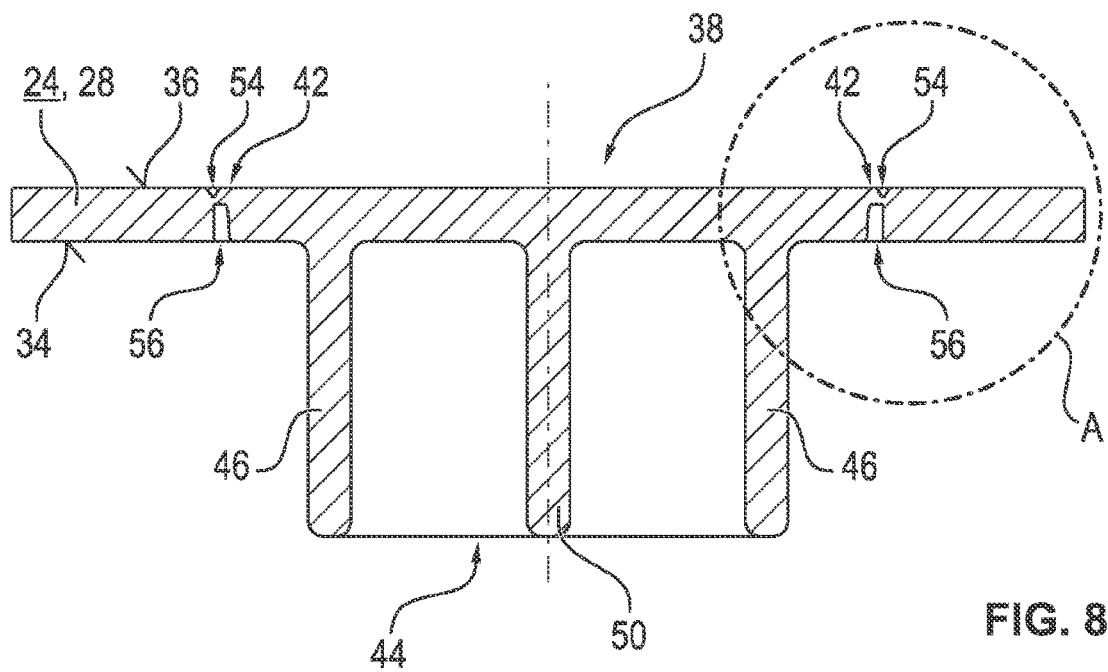
FIG. 8 shows a sectional illustration of the break-out element along section line VIII-VIII in FIG. 7.

The weakened region 42 is explained in more detail below on the basis of the sectional illustrations of FIG. 8 and FIG. 9. The weakened region 42 is formed substantially by two ring-shaped recesses or indentations 54, 56 in the main body 28 or the break-out element 38. The indentation 54 of approximately triangular cross section is made in the wet space side 36, and the indentation 56 of approximately U-shaped cross section is made in the dry space side 34 of the main body 28.

As can be seen in particular in the detail shown in FIG. 9, the apex region or the tip of the indentation 54 is axially aligned approximately with a corner region of the indentation 56, said corner region being formed between the vertical and horizontal U limbs. Between this tip region of the indentation 54 and the corner region of the indentation 56, the weakened region 42 is formed with the material thickness d1.

Figure 10:
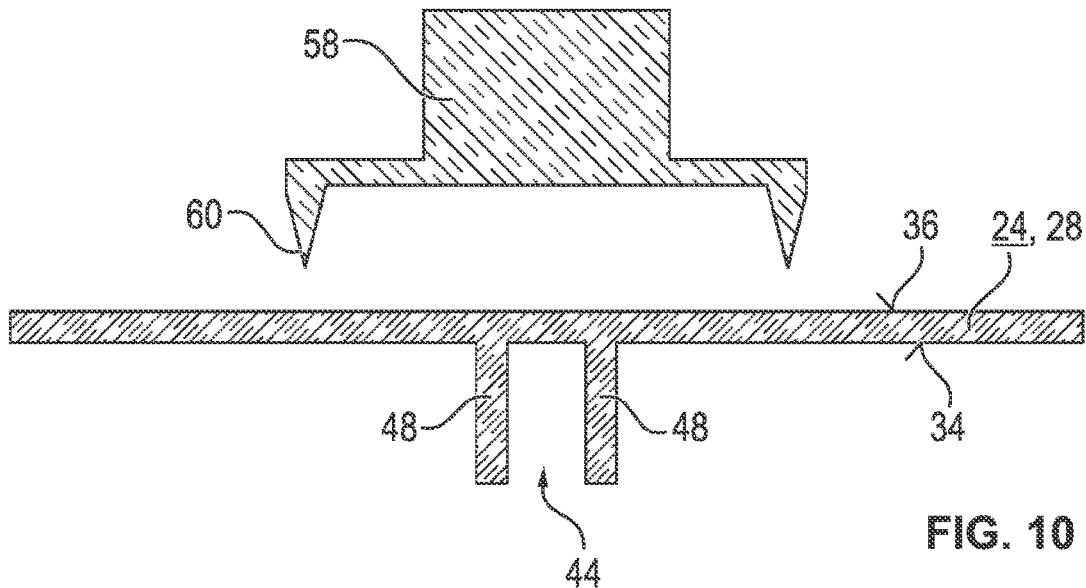
FIG. 10 to FIG. 12 show successive schematic illustrations of the production of the break-out element.
Figure 11:
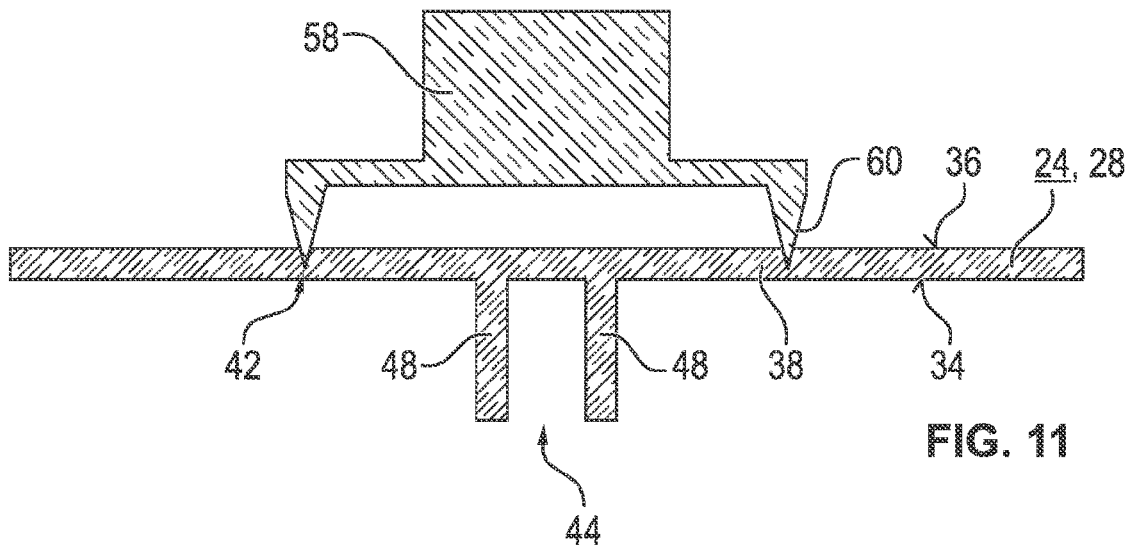
Figure 12:
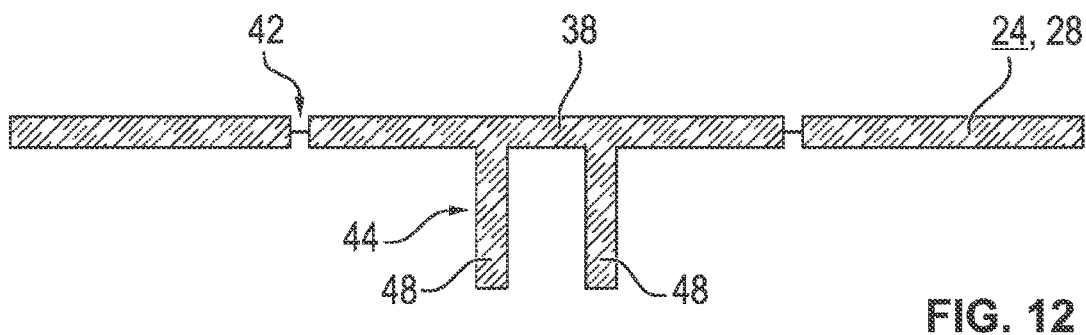

The production of the weakened region 42 between the assembly carrier 24 and the break-out element 38 is explained in more detail below on the basis of the schematic and simplified illustrations of FIGS. 10 to 12.

The assembly carrier 24 is preferably embodied as a plastics injection-molded part or as an injection-molded part. The break-out element 38 and the assembly carrier 24 or the main body 28 are jointly produced in an injection molding tool (not shown in any more detail).

In order to produce the weakened region 42, an embossing punch 58 with an embossing contour 60 is pressed or pushed into the (plastics) melt, which has not yet fully solidified, or cured, around the at least one break-out element 38 during the injection molding process. In other words, the weakened region 42 is produced by downward embossing or displacement of the melt which has not yet plastified or cooled.

The embossing punch 58 is for example in the form of a slider of the injection molding tool, in particular in the form of a mechanically or hydraulically actuated or actuable core pull. The embossing contour 60 is, for example, approximately hollow-cylindrical or tubular, and the embossing contour tapers on the free end side. In other words, the free end of the embossing contour 60 has, in cross section, approximately the shape of a wedge or the shape of a point.

During the production of the assembly carrier 24 and the break-out element 38, the weakened region 42 thus initially has the plastics melt supplied to it or applied to it by injection, and is subsequently embossed or thinned out, that is to say the material thickness is reduced, by means of the embossing punch 58. This ensures that the weakened region 42 is supplied with the plastics melt to a sufficient extent during the injection molding process, such that a fluid-tight weakened region 42 is ensured after the embossing.

The indentation 56 (not shown in FIGS. 10 to 12) is formed for example by a shape of the hollow space or of the cavity of the injection molding tool. The core pull or the embossing punch 58 is pressed into the melt in an axial or perpendicular manner from the subsequent wet space side 36, and the indentation 54 is thus formed by the displacement of the melt, which has not yet fully solidified or plastified, on account of the penetrating embossing contour 60.

Figure 13:
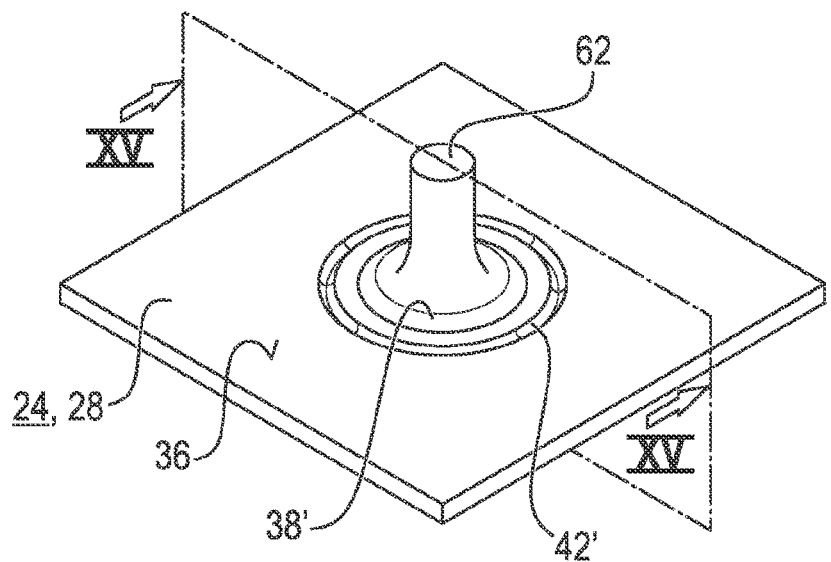
FIG. 13 shows a perspective view of a second embodiment of the break-out element.
Figure 14:
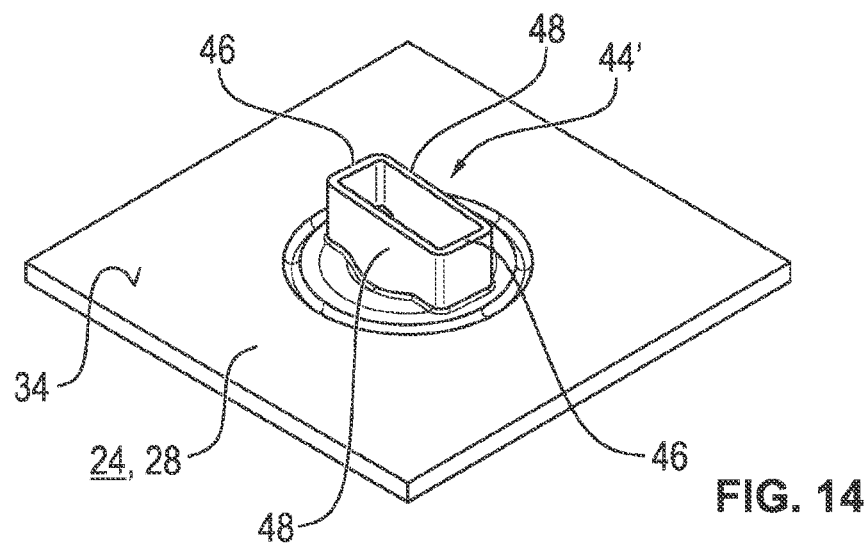
FIG. 14 shows a perspective view of the tool contour of the break-out element in a second embodiment.
Figure 15:
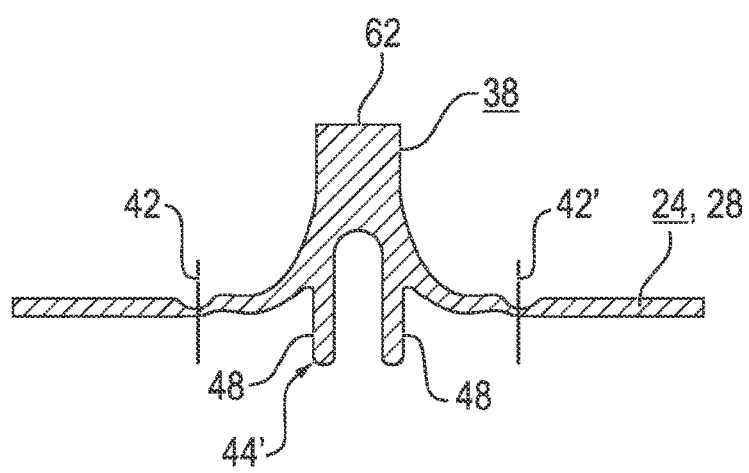
FIG. 15 shows a sectional illustration of the break-out element along section line XV-XV in FIG. 13.

A second embodiment of the break-out element 38' is shown in FIGS. 13 to 15 and explained in more detail below.

In contrast to the above-described exemplary embodiment, the break-out element 38' is not integrally connected to the assembly carrier 24 or the main body 28.

In this case, the break-out element 38' is embodied as a molded-on part of the assembly carrier 24. This means that the main body 28 is initially produced or injection-molded without the break-out element 38', and the break-out element 38' is subsequently injection-molded into the service openings 40 of the main body 28 in a time-offset manner. The break-out element 38' is molded on by a wet-space-side injection nozzle or hot runner nozzle, and thus has for example an axially projecting injection point 62 as sprue.

The weakened region 42' present in the assembly carrier 24 is produced by a dedicated, separate hot runner nozzle of the injection molding tool. In order to produce the break-out element 38' and the weakened region 42', merely a shot weight required for the break-out element 38' is injected into the prefabricated assembly carrier 24. The injected material plastifies at the interface to the rest of the main body 28 and in this case forms the weakened region 42' by way of a binding seam. The injection is preferably effected in a time-controlled manner.

Compared with the above-described embodiment variant, the tool contour 44' of the break-out element 38' has a simplified construction without the transverse web 50 and the stiffening ribs 52.

The invention is not restricted to the exemplary embodiments described above. It is rather also possible for other variants of the invention to be derived therefrom by a person skilled in the art, without departing from the subject matter of the invention. In particular, all individual features described in conjunction with the exemplary embodiments may furthermore also be combined with one another in some other way, without departing from the subject matter of the invention.

The following is a summary list of reference numerals and the corresponding structure used in the above description of the invention:

2 Window regulator
4 Window pane
6 Actuating motor
8 Actuating mechanism
10 Guide rail
12 Rail slider
14 Cable pull
16 Worm-gear/spur-gear transmission
18 Cable drum
20, 22 Cable deflection roller
24 Assembly carrier
26 Edge 28 Main body
30 Fastening point
32 Opening
34 Surface/dry space side
36 Surface/wet space side
38, 38' Break-out element
40 Service opening
42, 42' Weakened region
44, 44' Tool contour
46 Narrow side
48 Longitudinal side
50 Transverse web
52 Stiffening rib
54, 56 Indentation
58 Embossing punch
60 Embossing contour
62 Injection point
P Sliding position
O Open position
S Closed position
d1, d2 Material thickness

The invention claimed is:

1. An assembly carrier of a vehicle door, the assembly carrier comprising:
    assembly carrier material having a given material thickness;
    at least one break-out element connected to said assembly carrier material by way of at least one encircling weakened region having a smaller material thickness than said given thickness;
    said weakened region forming a predetermined breaking point and forming a boundary of a service opening;
    said weakened region being formed continuously in a shape of a ring around said break-out element, and said weakened region having the characteristics of having been produced by an embossing punch of the injection molding tool; and
    said break-out element and said assembly carrier material being a jointly injected-molded element formed together in an injection molding tool.

2. The assembly carrier according to claim 1, wherein said break-out element is molded in one piece, and said encircling weakened region is integrally connected to said assembly carrier material.

3. The assembly carrier according to claim 1, wherein said weakened region has a material thickness that is smaller than or equal to 15% of the given assembly carrier material thickness.

4. The assembly carrier according to claim 1, wherein said weakened region has a material thickness that is smaller than or equal to 0.5 mm.

5. The assembly carrier according to claim 4, wherein said weakened region has a material thickness that is smaller than or equal to 0.2 mm.

6. The assembly carrier according to claim 1, wherein said break-out element has a substantially rectangular tool contour, which is molded in one piece and configured for gripping with a tool.

7. The assembly carrier according to claim 6, wherein said tool contour has two narrow sides forming first gripping surfaces for first pliers, and two longitudinal sides forming second gripping surfaces for second pliers, and wherein said narrow sides are oriented perpendicularly to said longitudinal sides.

8. The assembly carrier according to claim 7, wherein each of said longitudinal sides of said tool contour has two stiffening ribs formed on an outer side thereof and oriented perpendicular thereto.

9. A method of producing an assembly carrier of a vehicle door, the method comprising:
    producing the assembly carrier and at least one break-out element jointly in an injection molding process; and
    forming a weakened region by pressing an embossing punch with an embossing contour into a melt, which has not yet fully solidified, during the injection molding process, with the weakened region enclosing the at least one break-out element.

10. The method according to claim 9, which comprises producing the break-out element with a perpendicularly projecting tool contour and pressing the embossing punch into the melt from a side of the assembly carrier opposite the tool contour.

11. An assembly carrier of a vehicle door, the assembly carrier comprising:
    assembly carrier material having a given material thickness;
    at least one break-out element connected to said assembly carrier material by way of at least one encircling weakened region having a smaller material thickness than said given thickness;
    said weakened region forming a predetermined breaking point and forming a boundary of a service opening;
    said weakened region being formed continuously in a shape of a ring around said break-out element;
    said break-out element and said assembly carrier material being a jointly injected-molded element formed together in an injection molding tool, and said break-out element having a substantially rectangular tool contour, which is molded in one piece and configured for gripping with a tool; and
    said tool contour having two narrow sides forming first gripping surfaces for first pliers and two longitudinal sides forming second gripping surfaces for second pliers, and said narrow sides are oriented perpendicularly to said longitudinal sides.

12. The assembly carrier according to claim 11, wherein said weakened region has the characteristics of having been produced by an embossing punch of the injection molding tool.

13. An assembly carrier of a vehicle door, the assembly carrier comprising:
    assembly carrier material having a given material thickness;
    at least one break-out element connected to said assembly carrier material by way of at least one encircling weakened region having a smaller material thickness than said given thickness;
    said weakened region forming a predetermined breaking point and forming a boundary of a service opening;
    said weakened region being formed continuously in a shape of a ring around said break-out element; and
    said break-out element and said assembly carrier material being a jointly injected-molded element formed together in an injection molding tool; and
    said break-out element being a molded-on part of the assembly carrier, and said encircling weakened region being a binding seam at the interface to the rest of the carrier.

* * * * *